Feb. 25, 1969 E. C. BEAN ET AL 3,429,534

MOUNTING DEVICE FOR ELECTRONIC EQUIPMENT

Filed Dec. 1, 1967 Sheet 1 of 2

INVENTORS
EDWARD C. BEAN
LADDIE T. RHODES

BY R. J. Erickson
ATTORNEYS

INVENTORS
EDWARD C. BEAN
LADDIE T. RHODES

BY R. J. Erickson
R. S. Sciascia
ATTORNEYS

United States Patent Office 3,429,534
Patented Feb. 25, 1969

3,429,534
MOUNTING DEVICE FOR ELECTRONIC EQUIPMENT

Edward C. Bean, 6406 White Oak Ave., Camp Springs, Md. 20031, and Laddie T. Rhodes, 4622 Cedar Ridge Drive, Oxon Hill, Md. 20021

File Dec. 1, 1967, Ser. No. 687,335
U.S. Cl. 248—25 7 Claims
Int. Cl. A47j *45/02;* H01b *17/16*

ABSTRACT OF THE DISCLOSURE

A device for mounting radio gear or other electronic components either rigidly upon an instrument shelf or in a manner to be isolated from shelf vibrations. The device includes a rectangular mounting plate having a rear lip which extends upwardly and forward to engage a flange on the instrument case. The case is held downwardly and rearwardly against the lip by an adjustable clamp bar which is secured to the plate by hinged T-bolts to permit easy mounting or removal of the case.

The invention described herein may be manufactured and used by or for the Government of the United States of America for governmental purposes without the payment of any royalties thereon or therefor.

*Background of the invention*

The present invention relates generally to mounting supports and particularly to hold-down devices for attaching a container such as a radio case or other apparatus to a flat surface.

Radio gear and other electronic equipment are frequently used in environments where they are subjected to mechanical vibrations, as in aircraft and other mobile vehicles, where it then becomes necessary to mount the equipment in a manner to prevent the equipment from being shaken loose and being permitted to bounce on the instrument shelf or fall off the shelf. While some equipment has been designed to withstand the vibrations and therefore may be rigidly mounted on a shelf, other equipment is not as rugged and must be mounted so as to be isolated from vibrations. This is normally done by means of isolators which generally comprise a spring means encased in a housing which is positioned between the vibration source and the member to be isolated. Prior art mounting devices have been designed for either rigid mounting or isolation mounting but are not capable of being used for both situations. The prior art devices have not proven to be satisfactory under all conditions of operation because they often fail to provide a positive hold-down means for the electronic equipment. Certain prior art mounting devices do not permit easy and fast installation and removal of the equipment for repair or replacement while other devices include certain mounting hardware which must remain attached to the instrument even after it is removed from the shelf, which then impedes repair of the instrument.

*Summary of the invention*

It is the general purpose of this invention to provide a mounting device which incorporates all of the advantages of prior art devices and yet is free of the disadvantages inherent in the previously known devices. To attain this purpose, there is provided a mounting device having a base plate which is rigid enough to support the instrument on isolators and yet has enough flexibility to permit the plate to conform to the contour of a shelf when being used to mount the instrument rigidly upon a shelf. The invention incorporates a clamp subassembly which includes a bar that is connected to the plate by means of pivoted T-bolts and this clamp subassembly provides a positive hold-down for the instrument case and yet facilitates quick removal of the instrument for repair or replacement.

It is an object of this invention therefore to provide a simple yet positive hold-down device for attaching a first member to a second member.

Another object of the invention is to provide a positive hold-down device for mounting a first member to a second member while permitting the ready removal of said first member for maintenance purposes.

Yet another object of the invention is to provide an improved mounting device which is capable of supporting a first member either rigidly upon a vibrating member or alternatively supporting the first member above said vibrating member by means of isolators.

Other objects and advantages of this invention will be readily appreciated as the same becomes better understood by reference to the following detailed description when considered in connection with the accompanying drawings and wherein:

*Description of a preferred embodiment*

Figure 1:
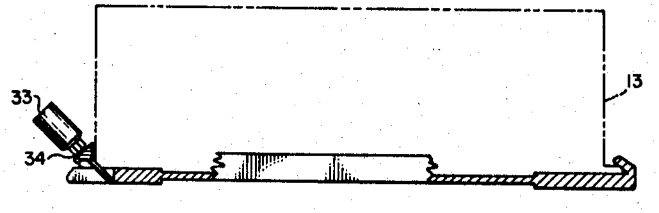
FIGS. 1 and 2 are elevational views of a mounting device constructed in accordance with preferred embodiment of this invention.
Figure 2:
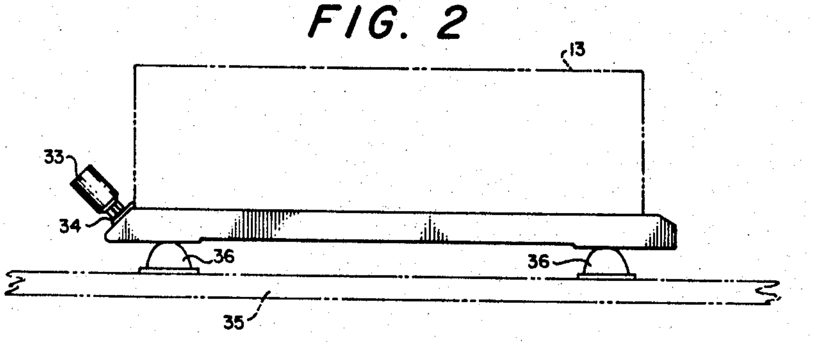

Referring now to the drawings wherein like reference numerals designate like parts throughout the respective views thereof, the mounting device of this invention is shown in FIGS. 1 and 2 as having a base plate 11 and a clamp bar 12 which cooperate to anchor a radio case or other electronic equipment contained in a box-like case 13 shown in phantom to an instrument rack or shelf. The base plate is of rectangular configuration having parallel longitudinal rails 14 and 15 joined together at opposite ends by transverse pad sections 16 and 17. The longitudinal side rails have a right angle cross-section to provide vertical side walls 18 and 19 which serve the dual purpose of imparting rigidity to the base plate while at the same time preventing lateral movement of an instrument case supported on the mounting plate. The rear pad 17 of the base plate has a lip 21 formed thereon which extends upwardly and inwardly toward the front of the plate for receiving and retaining a flange on the instrument case. In the lower portion of the front pad 16 is formed a pair of cylindrical recesses 24 and 25 which communiacte with slots 22 and 23, respectively, to receive the T-bolts of the clamp subassembly.

Figure 4:
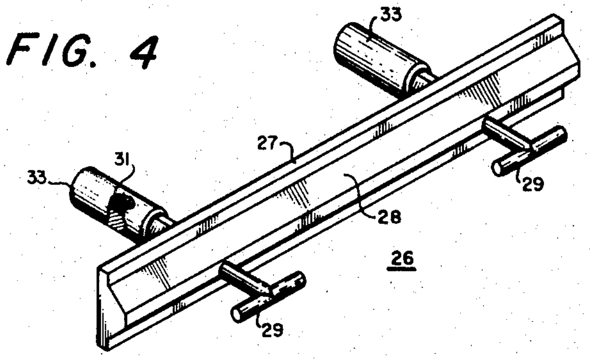
FIG. 4 is a perspective view of the clamp subassembly used with the base plate shown in FIG. 3.

Referring now to FIG. 4, the clamp subassembly 26 consists of a bar 27 having a wedge-like section 28 formed on one surface thereof for the purpose of engaging a flange on front of the instrument case. The wedge portion 28 may extend the full length of the clamp bar or may consist of separate segments. A pair of T-bolts 29 are shown as having a threaded shank 31 and a cylindrical cross member 32 formed thereon. The cross members 32 are received within the cylindrical recesses 24 and 25 in the bottom surface of front pad 16 of the base plate, while the threaded shanks 31 extend through the slots 22 and 23 in pad 16. The T-bolts are each provided with a thumb nut 33 and lock washer 34 for the purpose of tightening the clamp subassembly to draw the clamp bar downwardly and rearwardly against the forward flange on the instrument case to hold the instrument case down upon the base plate and in engagement with the lip 21 formed on the rear pad of the base plate.

Figure 3:
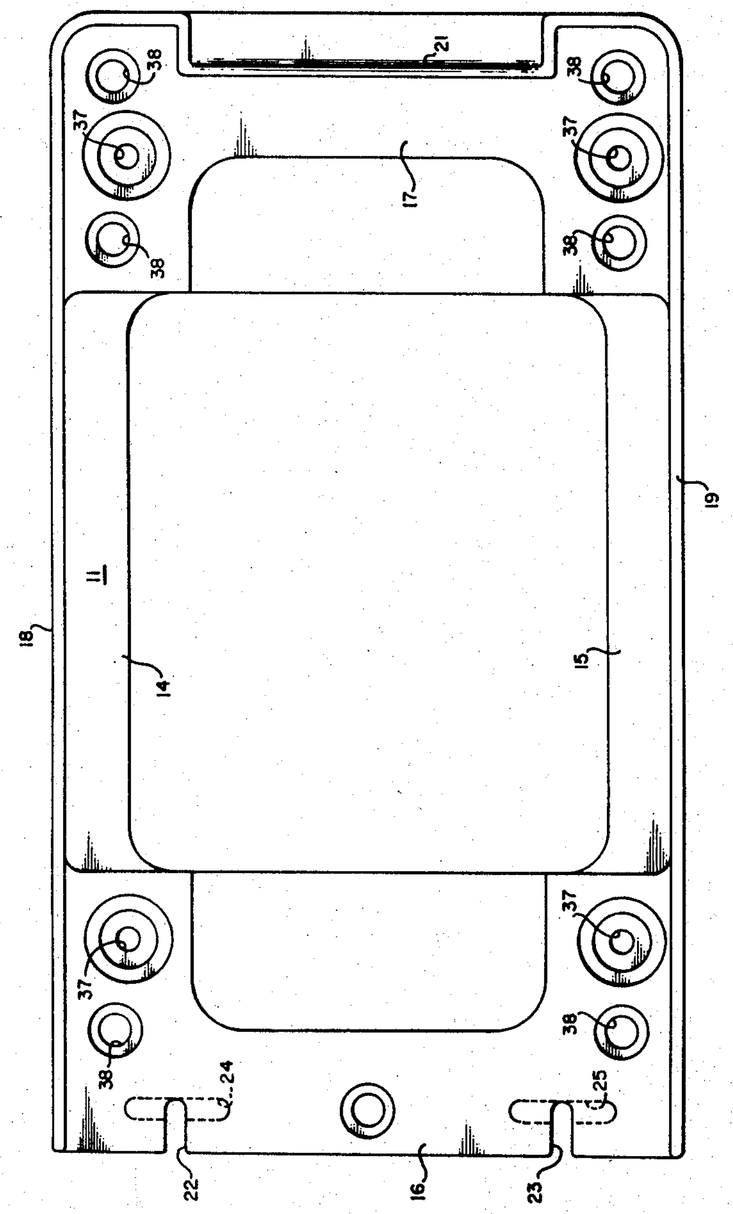
FIG. 3 is a plan view of the base plate portion of the preferred mounting device.

As shown in FIGS. 1 and 2, the front and rear pads of the base plate are thicker than the horizontal portion of the side rails 14 and 15 and extend above and below said horizontal portion of the side rails so that, when the pads are in contact with a flat shelf, the pads serve to space the side rails a small distance above the surface of the shelf and to space the instrument a small distance above the horizontal portions of the side rails. Thus, when the base plate is hard mounted on a shelf by means of screws in the seven small apertures formed in the base plate, the base plate is permitted to flex to the extent necessary to conform to the contour of the shelf and thus eliminate the use of shims which would otherwise be needed to compensate for surface irregularities of the shelf. It is noted that the central portion of the base plate as seen in FIG. 3 is completely open for the purpose of reducing weight and imparting a limited degree of flexibility to the plate. The base plate may be formed by casting or milling and is preferably constructed from aluminum or other light metals. As seen in FIG. 2, the base plate may be supported above an instrument shelf 35 by means of vibration isolators 36, connected to the base plate by screws through the four large apertures formed therein, to damp out vibrations of the shelf and thus protect the instrument supported on the base plate. The cross members 32 may be peened in the recesses 24 and 25 to retain the T-bolts in the recesses and prevent loss of clamp subassembly when the subassembly has been loosened to permit removal of the instrument case. The threaded shanks of the T-bolts may be provided with resilient retaining rings which will limit outward movement of the thumb nuts and prevent separation of the thumb nuts from the T-bolts. The thumb nuts may also be provided with a set screw or other suitable locking device to hold them in the tightened position and to prevent loosening of the thumb nuts by vibrations.

In operation, an instrument case may be removed from the shelf simply by loosening both thumb nuts to release the clamping force exerted on the instrument case by the clamp bar whereupon the clamp subassembly may be pivoted downwardly to permit removal of the instrument case. The cross members of the T-bolts may be captivated in the recesses 24 and 25 in the base plate so that, when the subassembly is loosened for removal of the instrument case, the subassembly remains attached to the base plate and therefore cannot be misplaced but instead is at hand when the instrument case is replaced on the base plate. Upon positioning an instrument case on the base plate, the clamp subassembly is swung upwardly into engagement with a flange on the front side of the instrument case. As both thumb nuts are tightened, the wedge portion of the clamp bar engages the flange on the front side of the instrument case to push the case downwardly and rearwardly into clamping engagement with the lip 21 on the rear pad of the base plate. When the thumb nuts are tightened securely the instrument case is held down firmly upon the instrument case by the lip 21 and the clamp bar 27 and thus is restrained from longitudinal or vertical movement, and further is restrained from lateral movement by the vertical side walls 18 and 19 formed on the side rails 14 and 15 of the base plate. When the instrument must be mounted in a manner to be isolated from the vibrations of the shelf, isolators 36 are attached to the base plate at the four recesses 37 and the isolators then attached to the shelf, whereby the instrument case is firmly secured to the base plate 11 but is isolated from the vibrations of the shelf 35, as seen in FIG. 2. On the other hand, when the instrument is to be hard mounted on a shelf, the base plate may be secured directly to the shelf by screws or bolts extending through the seven smaller apertures 38 formed in the base plate. The configuration of the base plate is such as to provide minimum weight and maximum strength for isolation mounting, as seen in FIG. 2, while at the same time the base plate configuration and arrangement of the seven apertures used for hard mounting give the base plate sufficiently flexibility to conform to the contour of the shelf.

The present invention provides a novel mounting means which may be used either for hard mounting or isolation mounting of a instrument case in an environment where it is subjected to vibrations. The design of the base plate and clamp subassembly are such that the instrument case is held down with a positive clamping force which is distributed evenly across the back of the instrument case by the lip 21 and across the front of the instrument case by the clamp bar 27, thus enabling larger clamping forces to be exerted on instrument case to assure that it be securely held down. The improved mounting device of this invention also includes a novel clamp subassembly which not only distributes the clamping force evenly across the instrument case but also is designed to facilitate easy and quick removal of an instrument case for repair or replacement by having the subassembly pivot on the cross member of the T-bolts to swing down and out of the way of the instrument case. The clamp subassembly also remains attached to the base plate and therefore does not become misplaced but rather is ready to be moved into position for clamping engagement with the instrument case. It is further noted that the design of the base plate and clamp subassembly is such that positive clamping action is exerted on an instrument case without requiring that any clamping hardware be attached to the instrument case. Thus, when the instrument is removed from the mounting device for maintenance, the instrument is free of all clamping hardware and repair of the instrument may be performed without being impeded by mounting hardware.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A hold-down support for a box-like member, comprising:

a base plate having first and second transverse mounting pads joined together by a pair of longitudinal side rails, a retaining lip formed on said first pad and being inclined upwardly and inwardly toward the second pad for clamping engagement with a flange on said member, an adjustable clamp assembly mounted on said second pad for clamping engagement with a second flange on said member, said clamp assembly including a plurality of threaded members connected at one end to said base plate and having a nut threaded on the opposite end thereof, and a clamp bar operatively connected to said threaded members, whereby the clamp bar may be positioned for engagement with a second flange on said box-like member to wedge the box-like member downwardly and rearwardly into engagement with said lip when the threaded nuts are tightened.

2. The device of claim 1 wherein:

said side rails have a right angle cross-section defining an upwardly extending vertical leg portion and a horizontal leg portion, and each of said pads have a bottom surface which extends below the bottom surfaces of said side rails.

3. The device of claim 2 wherein:

each of said pads have substantially flat top surfaces which extend higher than the horizontal leg portions of said side rails but lower than the top of said vertical leg portions.

4. The device of claim 3 wherein:

said mounting pads and said side rails are integrally formed.

5. The device of claim 1 wherein:

said threaded members comprise T-bolts having a threaded shank and a cylindrical cross member at one thereof, said cross members being pivotally received within recesses formed in said base plate.

6. The device of claim 5 wherein:

the cross-member receiving recesses are formed in the bottom surface of said second pad, and said second pad has slots formed therein to receive said shanks, said slots extending from said recesses to the forward edge of said pad.

7. The device of claim 6 wherein:

said clamp bar has a wedge-shaped member formed along one surface thereof to engage a flange on said box-like member, said clamp bar having apertures formed therein to receive the threaded shanks of said T-bolts.

References Cited

UNITED STATES PATENTS

| | | | |
|---|---|---|---|
| 2,566,656 | 9/1951 | David | 248—187 XR |
| 2,630,996 | 3/1953 | Lauther | 248—25 XR |
| 2,917,266 | 12/1959 | Sanborn et al. | 248—361 |
| 3,035,806 | 5/1962 | Hamer et al. | 248—361 |
| 3,212,746 | 10/1965 | Wright | 248—361 |

JOHN PETO, *Primary Examiner.*

U.S. Cl. X.R.

174—158; 248—361